(12) United States Patent
Hauvespre et al.

(10) Patent No.: US 9,752,669 B2
(45) Date of Patent: Sep. 5, 2017

(54) CAM FOLLOWER ROLLER DEVICE

(71) Applicants: Benoît Hauvespre, Saint Etienne de Chigny (FR); Gwenael Hingouet, Saint-Cyr-sur-Loire (FR)

(72) Inventors: Benoît Hauvespre, Saint Etienne de Chigny (FR); Gwenael Hingouet, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 11 days.

(21) Appl. No.: 14/572,892

(22) Filed: Dec. 17, 2014

(65) Prior Publication Data

US 2015/0176690 A1 Jun. 25, 2015

(30) Foreign Application Priority Data

Dec. 23, 2013 (FR) ..................................... 13 63390

(51) Int. Cl.
| | |
|---|---|
| *F16H 53/06* | (2006.01) |
| *F02M 59/10* | (2006.01) |
| *F02M 59/44* | (2006.01) |
| *F01L 1/14* | (2006.01) |

(52) U.S. Cl.
CPC .............. *F16H 53/06* (2013.01); *F01L 1/14* (2013.01); *F02M 59/102* (2013.01); *F02M 59/445* (2013.01); *F01L 2105/00* (2013.01); *F01L 2105/02* (2013.01); *F02M 2200/02* (2013.01); *F02M 2200/9038* (2013.01); *Y10T 74/2107* (2015.01)

(58) Field of Classification Search
CPC ..... F16H 53/06; F02M 59/102; F02M 59/445
USPC .......................................................... 74/569
See application file for complete search history.

(56) References Cited

U.S. PATENT DOCUMENTS

| | | | |
|---|---|---|---|
| 4,776,710 A | 10/1988 | Hara | |
| 7,748,359 B2 * | 7/2010 | Bartley .................. | F01L 1/146 123/90.48 |
| 2012/0031223 A1 * | 2/2012 | Dorn ...................... | F01L 1/143 74/569 |
| 2012/0051951 A1 * | 3/2012 | Dutt ..................... | F02M 59/102 417/364 |

FOREIGN PATENT DOCUMENTS

| | | | | |
|---|---|---|---|---|
| DE | 102008002378 A1 | * | 12/2009 | .......... F02M 59/445 |
| DE | WO 2012079831 A1 | * | 6/2012 | .......... F02M 59/102 |
| EP | 2672116 A1 | | 12/2013 | |
| GB | 1234215 A | * | 6/1971 | ........... F01B 1/0644 |
| JP | 2008196324 A | * | 8/2008 | |

* cited by examiner

*Primary Examiner* — Vicky Johnson
(74) *Attorney, Agent, or Firm* — Bryan Peckjian; SKF USA Inc. Patent Dept.

(57) ABSTRACT

The cam follower roller device comprises a body, a shaft mounted on the body, and a roller mounted on the said shaft in a rotationally movable manner and comprising two end faces. Each of the said faces is arranged at least in part axially facing an inner wall of the body. At least one of the end faces of the roller and/or at least one of the said inner walls of the body comprise an antifriction and wear-resistant coating.

11 Claims, 3 Drawing Sheets

CAM FOLLOWER ROLLER DEVICE

CROSS REFERENCE TO RELATED APPLICATION

This is a United States Non-Provisional Patent Application claiming the benefit of France Patent Application Number FR1363390 filed on 23 Dec. 2013 (23.12.2013), which is incorporated herein by reference in its entirety.

TECHNICAL FIELD OF THE INVENTION

The present invention relates to the field of cam follower roller devices used in automotive or industrial applications.

BACKGROUND OF THE INVENTION

One advantageous application of the invention is the use of the cam follower roller device in a fuel injection pump intended for an internal combustion engine, in particular of a motor vehicle such as an automobile or lorry.

A device such as this comprises a tappet or body and a roller mounted to rotate on the body and intended to cooperate with a cam synchronized with the camshaft of the internal combustion engine so that the rotation of the camshaft leads to a periodic displacement of a piston of the injection pump that bears against the said body, to allow fuel to be delivered.

Another advantageous application of the invention is the use of the device in a rocker system intended for controlling valves of an internal combustion piston engine.

In this application, the roller of the device is intended to cooperate, by rolling on it, with a cam of the camshaft of the internal combustion engine so that the rotation of the camshaft causes a periodic pivoting of a body of the device or of a rocker body, to open and close valves of the engine.

For these devices, the roller is generally mounted freely on a support shaft fixed to the body. During operation, and taking account of the forces applied to the device, in particular axial forces, contacts are produced between the roller and the body. Such axial contacts generate friction. Now, the body of these devices is conventionally obtained by forging, which generates a relatively high frictional torque, or even premature wear.

BRIEF SUMMARY OF THE INVENTION

The present invention aims to overcome these disadvantages.

More particularly, the present invention aims to provide a cam follower roller device having reduced frictional torque and/or increased wear resistance and which is easy to manufacture and to assemble.

In one embodiment, the cam follower roller device comprises a body, a shaft mounted on the body, and a roller mounted on the said shaft in a rotationally movable manner and comprising two end faces. Each of the end faces is arranged at least in part axially facing an inner wall of the body. At least one of the end faces of the roller and/or at least one of the said inner walls of the body comprise an antifriction and/or wear-resistant coating.

The arrangement of an antifriction and/or wear-resistant coating on at least one of the end faces of the roller and/or on at least one of the inner walls of the body makes it possible to limit the frictional torque of the device and/or the wear generated by the axial contacts between the roller and the body.

The roller may comprise an outer surface and a bore which are delimited axially by the end faces.

Preferably, the device comprises at least two antifriction and/or wear-resistant coatings. One of the coatings may be situated axially on one side of the roller and the other coating may be situated axially on the other side of the said roller.

In one embodiment, at least each end face of the roller comprises an antifriction and/or wear-resistant coating. Alternatively or in combination, at least each inner wall of the body may comprise an antifriction and/or wear-resistant coating.

The combination of at least a first coating provided on the end faces of the roller and of at least a second coating provided on the inner walls of the body and able to bear axially against one another makes it possible to further reduce the frictional torque of the device and the associated wear.

The coatings of the roller and of the body may be identical to one another. Alternatively, the coatings of the roller and of the body may be different from one another. Advantageously, each end face of the roller may comprise an antifriction coating and each inner wall of the body may comprise a wear-resistant coating, or vice versa. In one embodiment, the coating of each end face of the roller comprises diamond-like amorphous carbon and the coating of each inner wall of the body comprises tungsten bisulphide, or vice versa.

In one embodiment, the device additionally comprises a plain bearing interposed radially between the shaft and the roller. Preferably, at least one of the end faces of the plain bearing comprises an antifriction and/or wear-resistant coating.

In one embodiment, the ends of the shaft are fixed in holes of the body extending from the inner walls of the body. Alternatively, the body may additionally comprise a support provided with open bearing surfaces supporting the ends of the shaft.

BRIEF DESCRIPTION OF THE DRAWINGS

The present invention will be better understood on reading the detailed description of embodiments given by way of non-limiting examples and illustrated by the appended drawings, in which.

DETAILED DESCRIPTION OF THE PRESENT INVENTION

Figure 1:
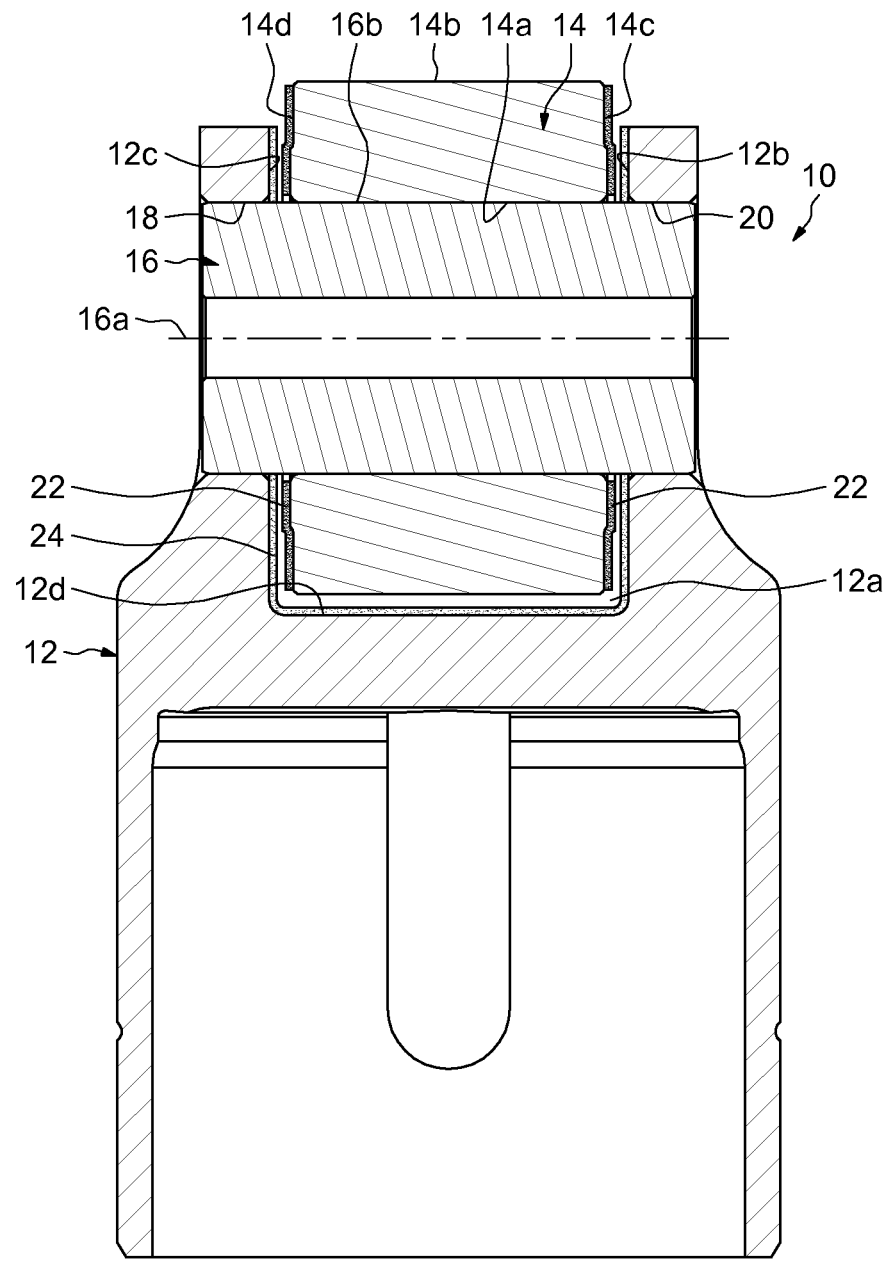
FIG. 1 is a view in section of a cam follower roller device according to a first example of the invention.

The device 10 comprises a tappet or body 12 and a roller 14 mounted to rotate with respect to the body and intended to bear against a cam synchronized with the camshaft of the internal combustion engine or directly against a cam of the said shaft. The body 12 delimits an outwardly open recess 12a inside which the roller 14 is mounted. The body 12 comprises two opposed radial front inner walls 12b, 12c axially delimiting the recess 12a. The roller 14 extends so as to project radially outside the body 12. The body 12 may advantageously be obtained at a low cost by forging or by cutting, stamping and bending from a blank of thin metal sheet.

The device 10 also comprises a shaft 16 of geometric axis 16a, mounted on the body 12 and supporting the roller 14.

The support shaft 16 comprises an axial cylindrical outer surface 16b on which the roller 14 is mounted. The shaft 16 extends axially on either side of the roller 14. The ends of the shaft are mounted inside through-holes 18, 20 formed in the body 12 axially facing one another. The holes 18, 20 extend from the inner walls 12b, 12c of the body. The shaft 16 is fastened by any suitable means to the body 12.

The roller 14 is mounted freely in rotation on the shaft 16. In the exemplary embodiment illustrated, the roller 14 is also mounted freely in translation on the shaft 16. The roller 14 comprises an axial cylindrical bore 14a mounted in direct radial contact with the outer surface 16b of the shaft and forming an inner surface, and an axial cylindrical outer surface 14b radially opposed to the said bore. The outer surface 14b of the roller forms a contact surface intended to bear against the associated cam of the internal combustion engine.

The roller 14 also comprises two opposed radial front end faces 14c, 14d axially delimiting the bore 14a and the outer surface 14b. A part of the end faces 14c and 14d axially faces the inner walls 12b and 12c, respectively, of the body, i.e. is oriented outwardly. In the exemplary embodiment illustrated, the end faces 14c, 14d have a stepped shape. In a variant, the faces could be planar.

In the exemplary embodiment illustrated each end face 14c, 14d of the roller comprises a coating 22 in order to limit friction and/or wear which are generated by axial contact between the roller 14 and the body 12. In one embodiment, the coating 22 comprises diamond-like amorphous carbon. Diamond-like amorphous carbon is known internationally under the designation DLC. Such a coating offers numerous advantages including self-lubricating properties and good resistance to abrasive, adhesive and corrosive wear. In a variant, the coating 22 may comprise tungsten disulphide (WS2), or black oxide ("black oxidizing"), or phosphate, or chromium nitride, or else titanium nitride. In a variant, it is possible to use any other coating having properties which make it possible to limit friction and/or to improve wear resistance. The coating 22 may for example have a thickness between 0.5 micrometer ($\mu$m) and 1 $\mu$m. In the figure, the thickness of each coating 22 has been increased for reasons of clarity.

The coating 22 is deposited on each end face 14c, 14d of the roller in the form of a hard layer. The coating 22 may be deposited, in a manner known per se, by industrial techniques, such as vacuum depositions or vapour phase depositions. The coating 22 may be deposited directly on each end face 14c, 14d of the roller, then forming a substrate. As an alternative, the coating 22 may be deposited on one or more intermediate layers deposited beforehand on each end face 14c, 14d.

In the exemplary embodiment illustrated, each coating 22 entirely covers the associated end face 14c, 14d of the roller. In a variant, it could be possible to provide the coatings 22 only on those parts of the end faces 14c, 14d axially facing the inner walls 12b, 12c of the body. The amount of coating to be deposited is thus reduced. In another variant, for reasons associated with the process of depositing the coatings 22, all of the roller 14 may be covered by the coating 22. Alternatively, it could also be possible to provide different coatings 22 for the end face 14c and for the opposed end face 14d of the roller.

So as to further limit friction and/or wear which are generated by axial contact between the roller 14 and the body 12, a coating 24 covers the inner walls 12b, 12c of the said body. The coating 24 provided on each inner wall 12b, 12c of the body axially faces the coating 22 provided on the associated end face 14c, 14d of the roller. The coating 24 of the body forms a friction surface with the associated coating 22 of the roller, and vice versa. Slight axial clearances remain between the body 12 and the roller 14.

In an identical manner to the roller 14, the coating 24 may comprise diamond-like amorphous carbon, or tungsten disulphide (WS2), or black oxide, or phosphate, or chromium nitride, or else titanium nitride. In a variant, it is possible to use any other coating having properties which make it possible to limit friction and/or to improve wear resistance. The coating 24 may for example have a thickness between 0.5 micrometer ($\mu$m) and 4 $\mu$m. In the figure, the thickness of the coating 24 has been increased for reasons of clarity.

In the exemplary embodiment illustrated, the coating 24 entirely covers the inner walls 12b, 12c of the body and an axial bottom wall 12d connecting the said walls. In a variant, it could be possible to provide two separate coatings 24 covering only those parts of the inner walls 12b, 12c of the body axially facing the end faces 14c, 14d of the roller. The amount of coating to be deposited is thus reduced. In this case, the two coatings may be identical to or different from one another.

Figure 2:
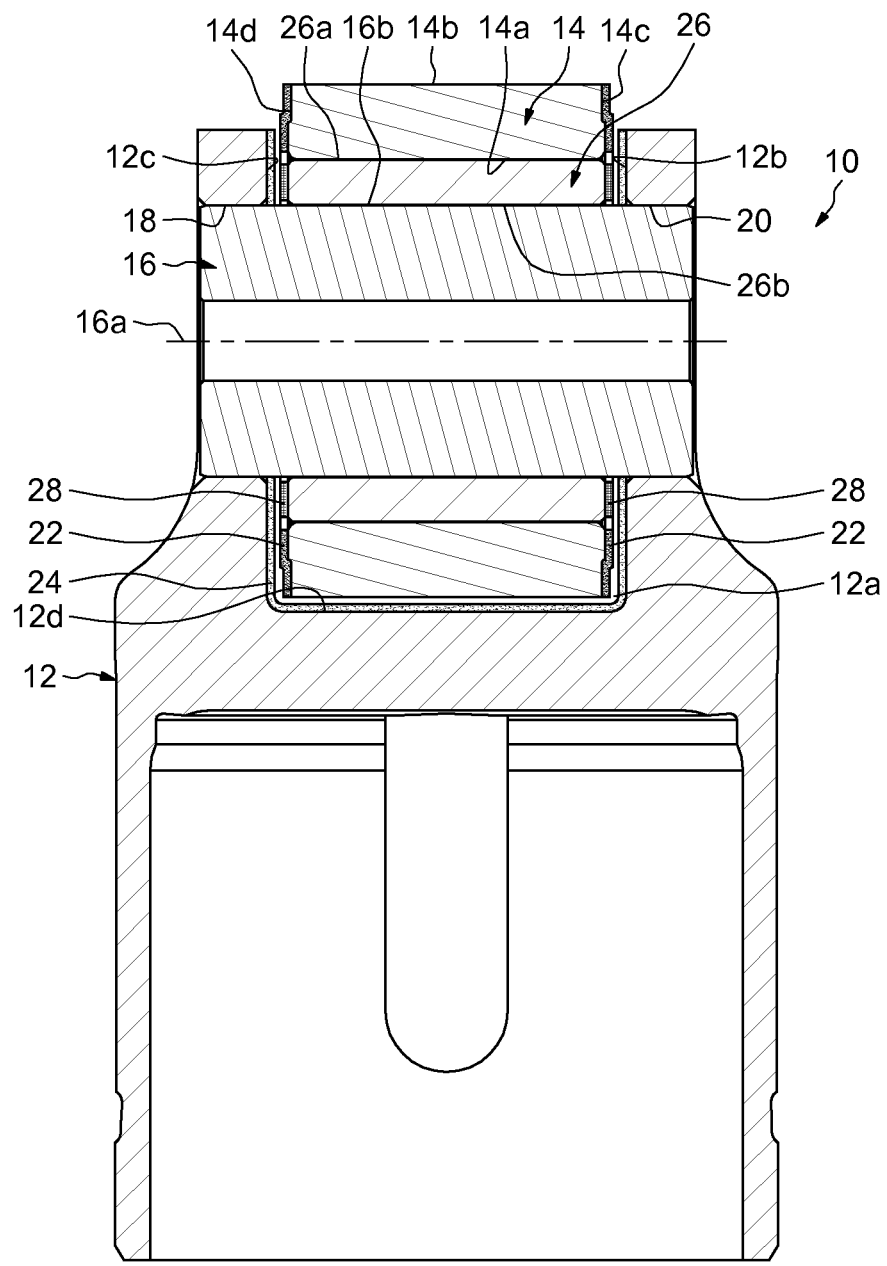
FIGS. 2 and 3 are views in section of cam follower roller devices according to second and third examples of the invention.

The exemplary embodiment illustrated in FIG. 2, in which identical elements bear the same references, differs in that the device 10 additionally comprises a plain bearing 26 interposed radially between the roller 14 and the shaft 16. The plain bearing 26 has an annular sleeve shape and is coaxial to the roller 14 and to the shaft 16. The bearing 26 comprises a cylindrical outer surface 26a mounted radially in contact against the bore 14a of the roller, and an opposed cylindrical bore 26b mounted radially in contact against the outer surface 16b of the shaft. The bearing 26 also comprises two opposed radial front end faces (not referenced) axially delimiting the outer surface 26a and the bore 26b. In the exemplary embodiment illustrated, each end face of the bearing 26 is flush with the associated end face 14c, 14d of the roller. The roller 14 is mounted on the shaft 16 via the bearing 26. The bearing 26 may be fixed to the roller 14 or to the shaft 16 or else mounted freely in rotation between them.

Each end face of the bearing 26 comprises a coating 28 for limiting friction and/or wear, covering the said face. The coating 28 provided on each end face of the bearing 26 may advantageously be identical to that provided on the associated end face 14c, 14d of the roller. In a variant, a single common coating may be deposited on the end face of the plain bearing 26 and the associated end face 14c or 14d of the roller, for example when the bearing is fixed to the roller. In another variant, it could also be possible not to provide a coating on the plain bearing 26. In this case, the axial dimension of the bearing 26 may be reduced such that its end faces are axially set back with respect to those of the roller 14.

Figure 3:
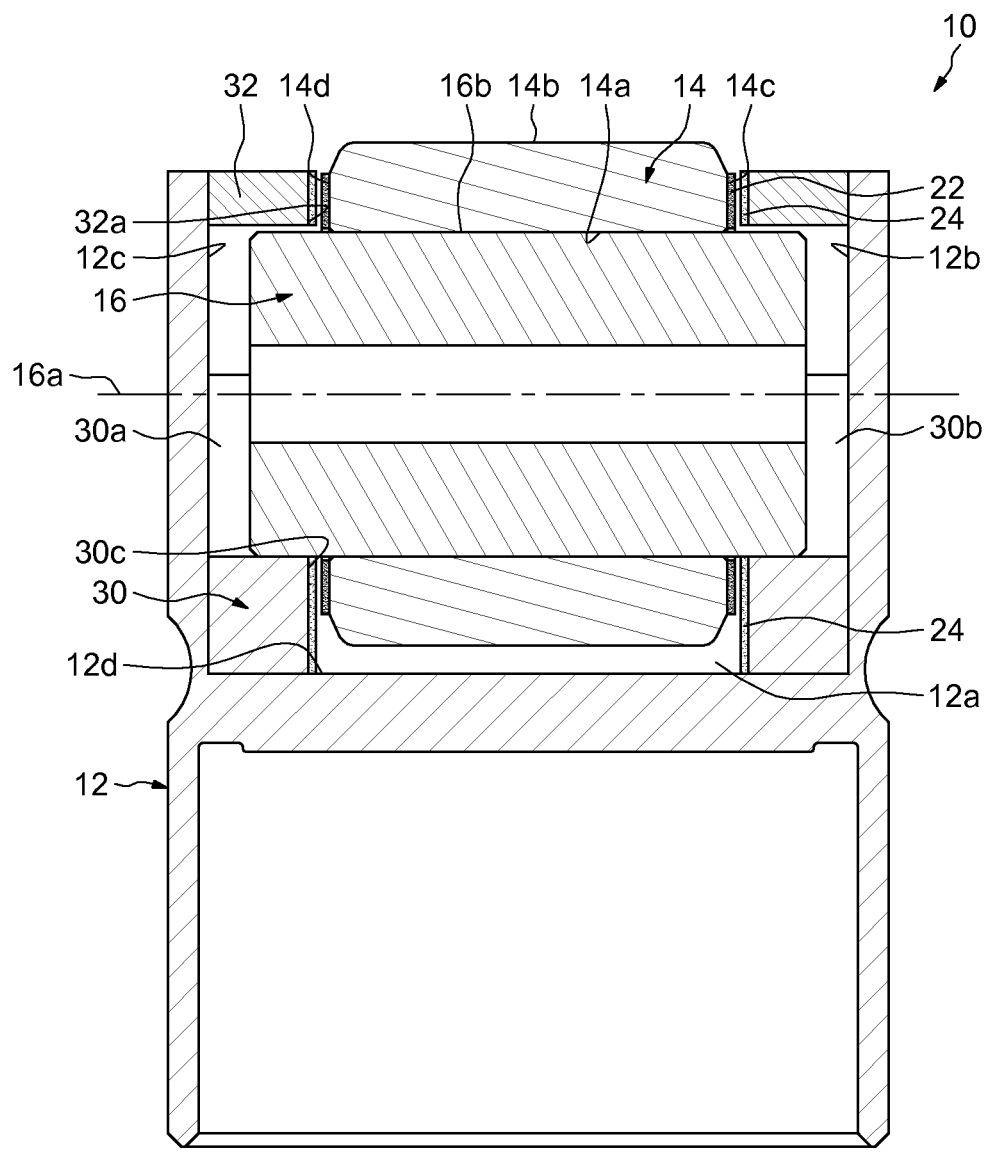

The exemplary embodiment illustrated in FIG. 3, in which identical elements bear the same references, differs mainly from the first exemplary embodiment described in that the device 10 comprises a support 30 mounted axially in bearing contact against the bottom wall 12d of the body and comprising bearings or bearing surfaces 30a, 30b which are open and oriented radially outwardly. The support 30 is fixed to the body 12 by any suitable means. The bearing surfaces 30a, 30b have a radially outwardly open semicircular profile with a diameter corresponding to the diameter of the shaft 16. The shaft 16 is mounted radially in contact against the bearing surfaces 30a, 30b of the support. The support 30 comprises a radial bore 30c comprising the coating 24.

In this exemplary embodiment, the body 12 also comprises an annular retaining ring 32 fixed at its end to retain the roller 14 relative to the said body during transport and assembly of the device 10. The retaining ring 32 comprises a radial bore 32a comprising the coating 24. The bores 32a and 30c of the retaining ring and of the support locally form annular inner walls of the body 12 covered by the coatings 24 which axially face the coatings 22 of the roller.

In the exemplary embodiment illustrated, the retaining ring 32 is an add-on part fixed to the body 12. Alternatively, it could be possible to form, at the end of the body 12, one or more local deformations of material so as to prevent the roller 14 being displaced out of the body 12 after assembly. In this case, the coating 24 is provided on the inner wall of each local deformation.

In the exemplary embodiments illustrated, antifriction and/or wear-resistant coatings are provided both on the roller 14 and on the body 12. Alternatively, it could be possible to provide one or more antifriction and/or wear-resistant coatings only on one of these two elements.

The present invention has been illustrated on the basis of a cam follower roller device which can for example be used in a fuel injection pump intended for an internal combustion engine. It is also possible, without departing from the scope of the invention, to provide a cam follower roller device in a rocker system which is used for the control of valves of an internal combustion engine and which comprises an antifriction and/or wear-resistant coating provided on at least one of the end faces of the roller and/or on at least one of the inner walls of the body axially facing the said end faces.

The invention claimed is:

1. A cam follower roller device comprising:
   a body;
   a shaft mounted on the body; and
   a roller mounted on the shaft in a rotationally movable manner and such that the roller is able to freely translate in an axial direction with respect to the shaft, the roller comprising two end faces joined by a radial outer surface extending therebetween, each of the end faces being arranged at least in part axially facing an inner wall of the body, the shaft radially positions and radially fixes the roller with respect to the body,
   wherein each end face of the roller comprises at least one of an antifriction coating and a wear-resistant coating, the at least one of the antifriction coating and the wear-resistant coating covering the entirety of each end face such that the at least one of the antifriction coating and the wear-resistant coating extends from a cylindrical bore of the roller to the radial outer surface,
   wherein the inner wall of the body comprises the at least one of the antifriction coating and the wear-resistant coating, the at least one of the antifriction coating and the wear-resistant coating covering the entirety of the inner wall of the body, wherein the at least one of the antifriction coating and the wear-resistant coating of the roller and the at least one of the antifriction coating and the wear-resistant coating of the body are different from one another,
   the shaft axially extends through the roller and at least partially into a cutout formed in the body and extending from the inner wall such that the body secures the shaft relative to the body in at least one direction, and
   wherein the radial outer surface of the roller does not contact any portion of the body.

2. The cam follower roller device according to claim 1, in which each of the two end faces of the roller comprises the antifriction coating and the inner wall of the body comprises the wear-resistant coating, or vice versa.

3. The cam follower roller device according to claim 2, in which the antifriction coating of each end face of the roller comprises tungsten disulphide and the wear-resistant coating of the inner wall of the body comprises diamond-like amorphous carbon.

4. The cam follower roller device according to claim 1, in which each end face of the roller comprises the wear-resistant coating and the inner wall of the body comprises the antifriction coating.

5. The cam follower roller device according to claim 4, in which the wear-resistant coating of each end face of the roller comprises diamond-like amorphous carbon and the antifriction coating of the inner wall of the body comprises tungsten disulphide.

6. The cam follower roller device according to claim 1, further comprising a plain bearing interposed radially between the shaft and the roller.

7. The cam follower roller device according to claim 1, wherein an axial bottom wall of the body comprises one of the antifriction coating and the wear-resistant coating.

8. The cam follower roller device according to claim 7, wherein the one of the antifriction coating and the wear-resistant coating comprise one of diamond-like amorphous carbon, tungsten disulphide, black oxide, phosphate, chromium nitride, and titanium nitride.

9. The cam follower roller device according to claim 1, wherein each end face of the roller has a stepped-shape.

10. A cam follower roller device comprising:
    a body;
    a shaft mounted on the body; and
    a roller mounted on the said shaft in a rotationally movable manner and comprising two end faces, each of the said faces being arranged at least in part axially facing an inner wall of the body,
    wherein each of the two end faces of the roller and each of the inner walls of the body comprise at least one of an antifriction coating and a wear-resistant coating,
    wherein the at least one of the antifriction coating and the wear-resistant coating of the roller and the at least one of the antifriction coating and the wear-resistant coating of the body are different from one another, in which each end face of the roller comprises the antifriction coating and each inner wall of the body comprises the wear-resistant coating, or vice versa, and in which the coating of each end face of the roller comprises diamond-like amorphous carbon and the coating of each inner wall of the body comprises tungsten disulphide.

11. A cam follower roller device comprising:
    a body;
    a shaft mounted on the body; and
    a roller mounted on the said shaft in a rotationally movable manner and comprising two end faces, each of the said faces being arranged at least in part axially facing an inner wall of the body,
    a plain bearing interposed radially between the shaft and the roller,
    wherein at least one of the end faces of the roller and at least one of the inner walls of the body comprise at least one of an antifriction coating and a wear-resistant coating, and wherein at least one of the end faces of the plain bearing comprises at least one of the antifriction coating and the wear-resistant coating.

* * * * *